United States Patent Office 3,246,032
Patented Apr. 12, 1966

3,246,032
FLUOROPHOSPHORANES
Reinhard Schmutzler, Wilmington, Del., assignor to E. I. du Pont de Nemours and Company, Wilmington, Del., a corporation of Delaware
No Drawing. Filed Jan. 21, 1963, Ser. No. 252,552
16 Claims. (Cl. 260—543)

This invention relates to a novel process for the preparation of fluorophosphoranes and to the novel compounds obtained thereby.

Continued growth in the field of organic and inorganic fluorine chemistry emphasizes the significance associated with the discovery of new fluorine-containing compounds and simple and economic methods for their preparation.

The process of this invention comprises contacting a phosphine sulfide with arsenic or antimony trifluoride, whereby the fluorophosphoranes are obtained directly. A mixture of the reactants need only to be heated gently until reaction occurs, and the fluorophosphorane is readily obtained from the reaction mass, usually by distillation at reduced pressures.

More particularly the process of this invention comprises contacting a phosphine sulfide of the formula:

$$R_pR'_mR''_q(PS_n)_c$$

where R is a monovalent hydrocarbon radical, R' is a bivalent hydrocarbon radical, both valences of which are attached to one phosphorus atom, and which has 4 to 5 carbon atoms between said valences, R'' is a bivalent hydrocarbon radical, the valences of which are attached to two different phosphorus atoms, $n$ is an integer from 1 to 2, $p$ is an integer from 0 to 4, $q$ is an integer from 0 to 1, $m$ is an integer from 0 to 2, and $c$ is an integer from 1 to 2, with a fluorinating agent selected from the group consisting of arsenic trifluoride and antimony trifluoride at a temperature from about 60 to about 120° C., with the proviso that when $c$ is 1, the sum of $p$ plus $2m$ is 3 and that when $c$ is 2, the sum of $p$ plus $2m$ is 4, and with the further proviso that when $n$ is 2, the phosphine sulfide is $RPS_2$.

As used herein when $p$ is greater than 1, the radical represented by $R_p$ may consist of the same or different hydrocarbon radicals. This is represented by the subscripts given to R where applicable in the following discussion, e.g. $R_1R_2$, etc.

The novel fluorophosphoranes provided hereby have the formula $$R_pR'_mR''_q(PF_y)_c$$

where R, R', R'', $p$, $m$ and $q$ are as defined above and $y$ is an integer from 2 to 3. With the proviso that when $c$ is 1, $q$ is equal to zero and the sum of $y$, $p$ and $2m$ is 5; when $c$ is 2, the sum of $2y$, $p$ and $2m$ is 8; and that at least one of $m$ and $q$ is an integer from 1 to 2.

In the process of the invention any of the many hydrocarbon phosphine sulfides defined above may be effectively employed. For example, there may be used (1) any phosphine sulfide of the formula (I) $$R_1R_2R_3PS$$

wherein each of the R groups is a hydrocarbon radical, from which difluorophosphoranes of the type $R_1R_2R_3PF_2$ are obtained; or two of the R groups may be replaced by a divalent radical, R', giving cyclic structures,

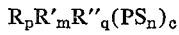

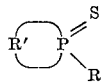

whereby the phosphorus is a member of a heterocyclic ring, from which difluorophosphoranes,

are obtained; (2) any hydrocarbon diphosphine disulfide of either formula (IIA) 

or (IIB) 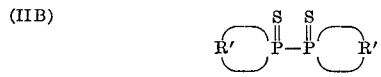

wherein the R groups are monovalent hydrocarbon radicals and the R' groups are divalent hydrocarbon radicals, from which trifluorophosphoranes of the types

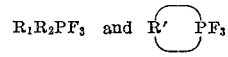

$R_1R_2PF_3$ and are obtained; (3) any hydrocarbon diphosphine disulfide of either formula (IIIA) 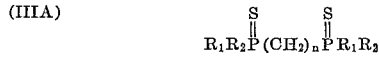

or (IIIB) 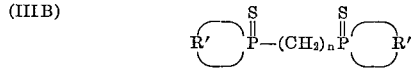

wherein each R is a monovalent hydrocarbon radical, each R' a divalent hydrocarbon radical and $n$ is an integer, for instance $n=1-10$, from which bis(difluorophosphoranes)

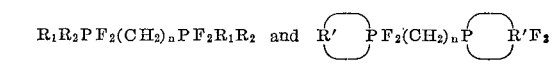

are obtained; and (4) any hydrocarbon phosphine sulfide of the formula, (IV) $(RPS_2)$ wherein R is a hydrocarbon radical, from which tetrafluorophosphoranes, $RPF_4$, are obtained. With regard to the monovalent R groups and the divalent R' group in each of the above formulae, the hydrocarbon radicals may be alike or different, they may be aliphatic or aromatic or a combination thereof, and they may be substituted with other hydrocarbon radicals. The divalent R' groups are four- or five-carbon chain radicals, such that the phosphorus is contained in a five- or six-membered ring.

Thus, any of the following may be reacted with arsenic or antimony trifluoride in the process of this invention:

trimethylphosphine sulfide,
triethylphosphine sulfide,
triisobutylphosphine sulfide,
triisoamylphosphine sulfide,
dimethylethylphosphine sulfide,
tri-n-butylphosphine sulfide,
triphenylphosphine sulfide,
tribenzylphosphine sulfide,
tri-(4-methylphenyl)-phosphine sulfide,
tri-(2,4-dimethylphenyl)-phosphine sulfide,
tri-(2,5-dimethylphenyl)-phosphine sulfide,
tri-(2,4,6-trimethylphenyl)-phosphine sulfide,
diethylphenylphosphine sulfide,
diethylbenzylphosphine sulfide,
diphenylethylphosphine sulfide,
diphenylpropylposphine sulfide,
diphenylallylphosphine sulfide,
diphenylvinylphosphine sulfide,
diphenyl-i-butylphosphine sulfide, diphenylbenzylphosphine sulfide,
tetramethyldiphosphine disulfide,
tetraphenyldiphosphine disulfide,
phenylthionophosphine,
ethylthionophosphine,
cyclohexylthionophosphine,
1-phenyl-1-phosphacyclopentane-P-sulfide,
1-cyclohexyl-1-phosphacyclohexane-P-sulfide,
phenylthionophosphine sulfide,
n-butylthionophosphine sulfide,
tetracyclohexyldiphosphine disulfide,
P,P,P',P'-tetracyclohexylpentamethylenediphosphine disulfide,
P,P,P',P'-tetracyclohexyltetramethylenediphosphine disulfide,
P,P,P',P'-tetracyclohexyltrimethylenediphosphine disulfide,
P,P,P',P'-tetraphenylpentamethylenediphosphine disulfide,
P,P,P',P'-tetraphenyltetramethylenediphosphine disulfide,
P,P,P',P'-tetraethylpentamethylenediphosphine disulfide,
P,P,P',P'-tetraethyltetramethylenediphosphine disulfide,
P,P,P',P'-tetraethyltrimethylenediphosphine disulfide,
1-phenyl-1-phosphacyclohexane-P-sulfide,
P,P,P',P'-tetraethylphenylenediphosphine disulfide, etc.

Either antimony trifluoride or arsenic trifluoride may be employed as the fluorinating agent in the process. Antimony trifluoride is preferred, however, since it is less sensitive to moisture, is less volatile, and being a solid, is more compatible with the sulfide reactants, which are also solids, each of which facilitates handling. Of course, the liquid arsenic trifluoride may be employed, if desired. Either is used in an amount sufficient to allow the reaction to proceed to completion. Thus at least stoichiometric quantities, and preferably slight excesses over these, are employed. An excess of the order of ten percent is adequate when antimony trifluoride is employed in the reaction, whereas—because of mechanical difficulties—as much as 30% excess of the arsenic trifluoride reactant is employed. Although there appears to be no advantage for deviations from stoichiometry other than these, such quantities may be employed, if desired, and unused starting materials may be recovered and recycled to another preparation.

Because of the reactivity of the fluorophosphoranes with moisture, it is necessary that the fluorination be effected under conditions which exclude the presence of moisture. These conditions are readily obtained by sweeping the reaction vessel with dry, oxygen-free nitrogen before it is charged with the reactants and maintaining a blanket of nitrogen throughout the reaction.

The reaction is usually carried out under slight vacuum to minimize difficulties with any moisture present although, as will be exemplified, ordinary atmospheric pressure may be employed.

The fluorination reaction is brought about by gentle heating, in the range of 60–120° C. Since best yields are obtained in the temperature range of 80–110° C., these are generally used and are preferred. Indication that the reaction has occurred is given by the presence of a temporary red color and the subsequent separation of a mixture of elemental antimony and/or black antimony trisulfide.

The phosphine sulfides employed as starting materials are for the most part prepared by standard techniques. For example, the phosphine sulfides, $R_3P=S$, are obtained by the straightforward addition of sulfur to the corresponding phosphine, $R_3P$. The diphosphine disulfides, $R_2P(S)P(S)R_2$, are prepared by reacting phosphorus thiotrichloride with the corresponding Grignard reagent. Many such procedures are given in the literature.

However, the cyclic diphosphine disulfides containing phosphorus as part of a heterocyclic ring are new compounds in themselves and are prepared by a reaction of phosphorus thiotrichloride ($PSCl_3$) with a di-Grignard reagent, XMgRMgX, where R is a divalent hydrocarbon radical and X is chlorine or bromine. The di-Grignard and the phosphorus thiotrichloride are simultaneously added dropwise to cold diethyl ether with stirring, the mixture is allowed to warm up slowly and finally is refluxed. At the completion of the reaction, the mixture is hydrolyzed by dilute aqueous acid and the water layer is extracted with an organic solvent such as chloroform. The disulfide is isolated from the organic phase, for instance, by evaporating the solvent and cooling the residue. The solid disulfides are recovered by simple filtration.

The di-Grignard reagents are of the type $$XMg—(CH_2)_nMgX$$

wherein the value of $n$ may be 4 or 5 and X may be chlorine or bromine. It is preferred to employ the bromo reactant, however, since higher yields are obtained. The di-Grignard and the phosphorus thiotrichloride are employed in essentially equivalent quantities, that is three moles of di-Grignard reagent per two moles of the phosphorus thiotrichloride. The condensation is carried out in a suitable solvent, such as ether, at temperatures within the range of —80 to 100° C. Temperatures of the order of zero degrees and below are preferred. Hydrolysis is usually with dilute sulfuric acid, although other dilute acids such as hydrochloric acid or even water alone may be employed.

The invention is more fully described by the following examples. Parts, where given, are by weight. The temperatures designated are all in degrees centigrade.

EXAMPLE I

*Dimethyltrifluorophosphorane* $(CH_3)_2PF_3$

The mixture of 37.2 parts of

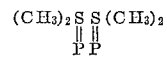

and 70 parts of $SbF_3$ is ground carefully in a nitrogen atmosphere and charged into a 100 ml. two-necked flask with a Liebig condenser and a thermometer. On gentle heating under $N_2$, distillation of a volatile liquid, B.P. 60–64°, commences at ca. 80° inner temperature. A total of 38.6 parts (82%) of a colorless liquid is collected. Boiling point (after redistillation) 62°. Its analysis is:

Calcd. for $(CH_3)_2PF_3$ (118.05): C, 20.4; H, 5.1.
Found: C, 20.0; H, 4.8

The identity of the product as $(CH_3)_2PF_3$ was confirmed by comparing boiling point, analysis and IR-spectrum with those of an authentic sample prepared by an alternate route.

The

is prepared in the following manner:

To 475 parts of $CH_3MgBr$ in 1000 parts of ether is added slowly with stirring 208 parts of $PSCl_3$ at a temperature between 0–5° C. The mixture is then stirred for 1 hour and decomposed with 10% $H_2SO_4$. Upon standing overnight, 107 parts of an insoluble, white solid separate out. The solid is recrystallized and identified as tetramethyldiphosphine disulfide.

EXAMPLE II

*Di-n-butyltrifluorophosphorane* $(n-C_4H_9)_2PF_3$

A mixture of 26.5 parts of

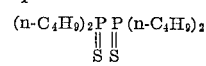

with 40 parts of $SbF_3$ is finely ground under $N_2$ and placed in a two-necked flask fitted with a thermometer and a Liebig condenser. The system is evacuated (10 mm.) and heated, the mixture turning dark red-brown almost immediately. At ca. 70°, most of the contents of the flask liquifies, and 13 parts of the fluorophosphorane, B.P. 69–87°, is collected. The crude $(n-C_4H_9)_2PF_3$ is redistilled to give a colorless, reactive liquid, B.P. 71°/10 mm. (10.2 parts). Its analysis is Calcd. for $(C_4H_9)_2PF_3$ (202.2): C, 47.5; H, 9.0; P, 15.3; F, 28.2
Found: C, 47.6; H, 8.9; P, 16.3; F, 24.5

The

is prepared in the following manner:

A Grignard reagent, $C_4H_9MgBr$, is prepared from 550 parts of $n-C_4H_9Br$ and 97.3 parts of Mg is 1000 parts of ether. One-hundred seventy parts of $PSCl_3$ is added slowly, with stirring at 0–5° C. and the mixture is refluxed for 1 hr. The mixture is then decomposed with 10% $H_2SO_4$, the ether layer is separated and dried over $Na_2SO_4$. The ether is evaporated, the residue is cooled and 64 parts of clear, colorless leaflets melting over the range 73–76° C. separate. The crystals are identified as the tetra-(n-butyl)diphosphine disulfide.

EXAMPLE III

*Phenylmethyltrifluorophosphorane $(C_6H_5)(CH_3)PF_3$*

Thirty-one parts of

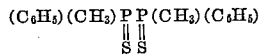

and 40 parts of $SbF_3$ is finely ground under $N_2$ and heated at 10 mm. in a system similar to that described in Example II. A dark red-black color indicates the progress of the reaction on gentle heating, and 28.5 parts (79.2% as $(C_6H_5)(CH_3)PF_3$) of a colorless liquid, B.P. ca. 70–80°/10 mm., is collected. Redistillation over a 10 inch helixpacked column after one day standing gives 20.0 parts of a pure product, B.P. 64°/9 mm.; $n_D^{26.5} = 1.4646$. The compound is considerably more stable than $$(CH_3)_2PF_3$$

but less stable than $(C_6H_5)_2PF_3$, when stored in glass. Its analysis is:

Calcd. for

(180.11): C, 46.7; H, 4.5; F, 31.6
Found: C, 46.7; H, 4.5; F, 31.5

The

is prepared in the following manner:

To 250 parts of $CH_3MgBr$ in 1000 parts of ether is slowly added with stirring 211 parts of $C_6H_5PSCl_2$ at 0–5° C. The mixture is allowed to stand overnight at room temperature and then is decomposed with 10% sulfuric acid. A white solid (180 parts), identified as the above compound, separates out. The product is filtered and washed with water.

EXAMPLE IV

*Tri-n-butyldiflorophosphorane $(n-C_4H_9)_3PF_2$*

The starting tri-n-butylphosphine sulfide is prepared by adding the stoichiometric amount of sulfur in small portions under $N_2$ to the stirred phosphine. The strongly exothermic reaction is controlled by ice-cooling. Reaction is complete within less than 30 minutes, as indicated by the disappearing phosphine odor. The colorless reaction mixture solidifies below 0°, but is liquid at room temperature. On distillation i.v., the phosphine sulfide is obtained as a liquid, B.P. 129–130°/0.5 mm.;

$$n_D^{25} = 1.5011$$

Its analysis is:

Calcd. for $(C_4H_9)_3PS$ (234.39): C, 61.5; H, 11.6; S, 13.7.
Found: C, 61.1; H, 11.4; S, 13.9.

An orange-yellow color is observed immediately when 13.4 parts of $SbF_3$ is added with stirring in small portions to 21 parts of the crude $(n-C_4H_9)_3PS$. The mixture is heated gently under a vacuum of ca. 30 mm., and the color becomes intensively red-black. After 2 hrs. heating at a maximum of 130°, the mixture is cooled and distilled i.v. to give 15.5 parts of a colorless liquid, B.P. 75–125°/0.5–2 mm. Redistillation over a 5 inch Vigreux column gives 13.2 parts (61%) of pure $(n-C_4H_9)_3PF_2$, having a B.P. 71–72°/0.4 mm.; $n_D^{20} = 1.4346$; $n_D^{26.5} = 1.4318$. Its analysis is:

Calcd. for $(C_4H_9)_3PF_2$ (240.32): C, 60.0; H, 11.3; F, 15.8; P, 12.9.
Found: C, 59.9; H, 11.7; F, 15.5; P, 12.9.
$(C_4H_9)_3PF_2$ is odorless. Mol. wt.: Calc. 240. Found 247.

EXAMPLE V

*P,P,P',P'-tetramethylethylene-bis-difluorophosphorane*

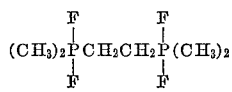

Sixteen parts of $(CH_3)_2P(S)C_2H_4P(S)(CH_3)_2$ and 35 parts of $SbF_3$ is finely ground under $N_2$ in a dry box and transferred in a countercurrent of $N_2$ to the bottom part of a vacuum sublimer. On gentle heating i.v. (~10 mm.) the mixture turns dark (starting at ca. 40°) and a white solid readily sublimes to the Dry Ice probe. The sublimation is ended after ~2 hrs., and 10.1 parts (59.4%) of a very deliquescent material is isolated which is resublimed at ca. 70°/10 mm. (water-cooled probe).

In a preliminary experiment, the product was isolated by distillation (B.P. ca. 78°/5 mm.), readily solidifying in the water-cooled condenser, but the sublimation method described above is more satisfactory.

Samples of the freshly sublimed product slowly attack glass. Its analysis is:

Calcd. for

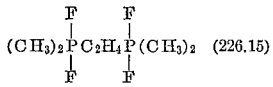

C, 31.8; H, 7.1; P, 27.4; F, 33.60.
Found: C, 31.6; H, 7.4; P, 26.0; F, 33.65.

The M.P. is 47.1–48.4° (sealed tube, filled in a dry $N_2$ atmosphere).

EXAMPLE VI

*Bis-cyclotetramethylenediphosphine disulfide*

A Grignard reagent is prepared from 216 parts of 1,4-dibromobutane and 48.6 parts of magnesium turnings in 560 parts of ether. A four-necked flask is fitted with a mechanical stirrer, a reflux condenser with drying tube and two dropping funnels. The system is evacuated and filled with nitrogen. Under a blanket of nitrogen, the Grignard solution is filtered into the dropping funnel, while 102 parts of phosphorus thiotrichloride is placed in the other funnel. Ether (550 parts) is placed in the flask and the simultaneous addition of the reactants is started after the ether is cooled to −80°. A white precipitate is formed immediately, sometimes accompanied by highly viscous materials so that stirring becomes difficult. The addition is completed in three to four hours and after 1 hour stirring at −80°, the mixture is allowed to warm up slowly. After one hour refluxing the reaction mixture is decomposed with ice/10% sulfuric acid. The water layer is extracted with four 400-part portions of chloroform, and the combined organic extracts are repeatedly washed with water, and dried over calcium chloride. Removal of the solvents by distillation leaves a yellow liquid, which usually solidifies partially upon cooling to room temperature. The amount of solid precipitated is increased by cooling with ice. The product is readily separated from the highly viscous by-products by filtration. An additional amount of diphosphine disulfide separates from the mother liquor upon prolonged cooling below 0°. The combined yield of product being sufficiently pure for further reactions after one recrystallization from toluene-ethanol 3:1 ranges between 12–15 parts (15–19%). An analytical sample is recrystallized twice from the same solvent to give beautiful white prisms, some being up to 50 mm. long. The melting point of the purified product is 185° C. Its analysis is:

Calcd. for

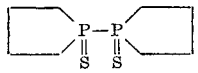

C, 40.3; H, 6.8; P, 26.0; S, 26.9; mol. wt., 238.3.
Found: C, 40.1; H, 6.9; P, 26.0; S, 27.3; mol. wt. 236, 231.
IR spectrum (in KBr): 2940, 2860 (m.); 1439 (m.); 1395 (m.); 1298 (m.); 1249 (w.); 1103 (s.); 1049 (m.); 1019 (m.); 958 (w.); 839 (s.); 761 (m.); 715 (v.s.); 697 (s.).

EXAMPLE VII

*Bis-cyclopentamethylenediphosphine disulfide*

The apparatus is similar to that described in Example VI.

To a di-Grignard reagent prepared from 230 parts of 1,5-dibromopentane and 48 parts of magnesium in 500 parts of ether is added with stirring 113.2 parts of phosphorus thiotrichloride in 56 parts of ether at 0±5°. During the strongly exothermic reaction a highly viscous oil separates and makes stirring difficult. Work-up after 1 hr. reflux is as in Example VI, the aqueous phase being extracted with three 450 parts of chloroform, which are combined with the ether extract. After washing with water and drying with calcium chloride, the solvents are distilled off on a steam bath. Upon standing overnight the yellow oil thus left partially crystallizes and the crystals are collected by filtration. Six parts (~6.8%) of crystalline material is obtained, which is recrystallized from toluene-ethanol 3:1. An analytical sample is twice recrystallized from the same solvent. Even upon repeated recrystallizations the substance invariably softens first at 185° and is completely melted at 225°. Its analysis is:

Calcd. for

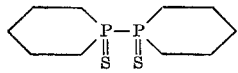

C, 45.1; H, 7.6; P, 23.3; S, 24.1; mol. wt., 266.35
Found: C, 45.0; H, 7.7; P, 23.4; S, 24.0; mol. wt. 282, 284
IR spectrum (in KBr): 2923, 2858 (m.); 1630 (v.s., bd.); 1444, 1402 (m.); 1340, 1329 (w.); 1210, 1191, 1114 (m.); 1028, 930 (v.s.); 875 (m.); 825, 803, 778 (m.); 711 (v.s.); 679 (m.).

EXAMPLE VIII

*Cyclo-tetramethylene trifluorophosphorane*

A mixture of 11.9 parts of bis-cyclotetramethylenediphosphine disulfide prepared as in Example VII with 26.8 parts of antimony trifluoride is carefully ground in a dry box and placed under nitrogen protection into a round bottom flask. The latter is immediately attached to a downward condenser, assembled for distillation in vacuo. The mixture is heated at 130–150 mm., and the reaction starts quickly, as indicated by rapid darkening. After heating for one hour a liquid starts to distill. Product boiling between 90–130°/130–150 mm. (12.0 g.) is collected and redistilled in vacuo through a micro-Vigreux column. The boiling point of the twice redistilled product is 61–62°/90 mm. Seven and four-tenths parts (51.4%) of the purified trifluorophosphorane is isolated, but the actual yield is probably considerably higher, since the glass apparatus is severely attacked. Cyclotetramethylene-trifluorophosphorane is extremely reactive with moisture.

Its analysis is:

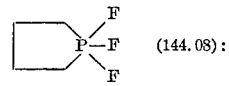 (144.08):

C, 33.4; H, 5.6; F, 39.5; P, 21.5
Found: C, 33.3; H, 5.5; F, 38.1; P, 21.8

EXAMPLE IX

The procedure of Example VIII is followed except that bis(cyclopentamethylene)-diphosphine disulfide, prepared as in Example VII is substituted for the bis(cyclotetramethylene)-diphosphine disulfide. The compound

is obtained in essentially equivalent yield; B.P. 64–65°/40 mm.

EXAMPLE X

*Phenyl-(di-n-butyl)-difluorophosphorane*

(a) *Phenyl-di-n-butylphosphine sulfide* is prepared by the addition of 1.3 parts of sulfur to 8.9 parts of phenyl-di-n-butylphosphine in 50 parts of benzene. Removal of the solvent after 30 min. reflux leaves a solid which is twice recrystallized from hexane to give rhombic colorless crystals. Yield, 8.5 parts (83.5%). M.P. 50.5–51.5°.

*Analysis.*—Calcd. for $(C_6H_5)(C_4H_9)_2P=S$: C, 66.1; H, 9.1; P, 12.2; S, 12.6. Found: C, 65.9; H, 9.2; P, 12.0; S, 13.0.

(b) *Phenyl - di-n-butyl-difluorophosphorane.*—A mixture of 7.5 parts of phenyl-di-n-butyl-phosphine sulfide and 5.4 parts of $SbF_3$ is carefully ground under nitrogen and heated in a distillation apparatus at 20 mm. vacuum. Rapid darkening indicates the progress of the reaction, but virtually no distillable material is obtained after 2.5 hrs. heating at 120°. The reaction mixture is then extracted with 30 parts of boiling benzene in a nitrogen atmosphere. Distillation of the residue remaining after removal of the benzene solvent gises 0.9 g. of a faintly yellow oil, M.P. 89°/0.3 mm.; 80°/0.08 mm.;

$$n_D^{24.4}=1.5010$$

identified by analysis as phenyl-di-n-butyl-difluorophosphorane. Its analysis is:

Calcd. for $(C_6H_5)(C_4H_9)_2PF_2$ (260.3): C, 64.6; H, 8.9; F, 14.6
Found: C, 64.7; H, 8.8; F, 12.5

EXAMPLE XI

The phosphine sulfide,

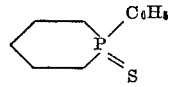

is prepared by adding sulfur to the corresponding phosphine,

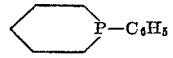

in accordance with the procedure given in K. Issleib and S. Häusler, Chem. Ber. 94, 113 (1961). The phosphine sulfide (6.5 parts) and 6 parts of $SbF_3$ are ground under nitrogen and heated in a distillation apparatus at reduced pressure (10 mm.) for 2 hours at 100° C. The product, identified as

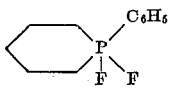

is recovered in good yield by distillation at 100–120° C. at 5 mm.

EXAMPLE XII

The phosphine sulfide

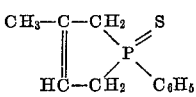

is prepared in accordance with the procedure given in U.S. 2,663,738, McCormack, as follows: Two hundred grams (1.12 moles) of dichlorophenylphosphine and 38.0 grams (0.56 mole) of isoprene are mixed with 2.0 grams of copper stearate and allowed to stand for 18 days. A red viscous lower-layer forms initially and gradually changes to yellow, compact needle clusters. The mixture is diluted with petroleum ethers. The petroleum ether layer containing the excess phenylphosphorus dichloride is decanted and the crystals are washed with additional petroleum ether. They are then crushed, suspended in benzene, and treated with gaseous hydrogen sulfide by bubbling the gas through the suspension. The evolved hydrogen chloride is collected and titrated. Altogether 0.80 mole are evolved. All of the solid goes into solution. The benzene is removed by distillation under reduced pressure. The bulk of the residue distills at 173–175° C. (1.0 mm.), giving 93.1 grams of colorless oil which solidifies to a white solid upon cooling. This represents an 80% yield of the crude phosphine sulfide. There remain 39.7 grams of a glassy residue which is soluble in chloroform but insoluble in water or in caustic.

Eighty-eight grams of the white solid phosphine sulfide is dissolved in an equal weight of 95% alcohol at 50° C. and water is added until a cloudiness develops, at 45° C. By scratching and slow cooling to 0° C., there are obtained 74.8 grams of crystals melting at 66–69° C. Recrystallization gives 71.3 grams melting at 68.5–69.0° C. A portion of this product is sublimed to give an analytical sample which melts at 69–70° C.

The phosphine sulfide (4.9 parts) and 4.5 parts of SbF$_3$ are ground together under nitrogen and heated in a distillation apparatus at reduced pressure (50 mm.). At 100° an intense orange color, turning black after some time, rapidly developed. The mixture is heated for 3 hours at 100–120° The product

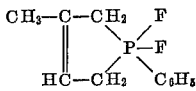

is recovered by distillation at 100–120° C. at 5 mm.

EXAMPLE XIII

*P,P,P',P'-tetramethylethylene-bis-difluorophosphorane*

A mixture of 10.7 parts of

and 20 parts of AsF$_3$ is heated slowly to 100° C. maximum inner temperature for a total of 4 hours. Formation of bright yellow As$_2$S$_3$ occurs rapidly. The volatile products are removed in vacuo (50 mm./30° C.) and the residue is sublimed at 1 mm. A white crystalline sublimation product, identical to that obtained in Example V is recovered.

The fluorophosphoranes of this invention are useful as polymerization catalysts, for example, for the fast polymererization of caprolactam to 6-nylon and for the polymerization of tetrahydrofuran to a polyether. The compounds are also useful biological agents, additives which impart fire retardant properties and surface modifiers for polyamides to reduce hydrophilicity.

The invention has been fully described hereinbefore. Many additional modifications will be apparent to those skilled in the art without departing from the inventive concepts.

I claim:
1. A fluorophosphorane selected from the group consisting of R$_1$R$_2$PF$_2$(CH$_2$)$_n$PF$_2$R$_1$R$_2$,

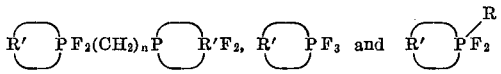

wherein the R groups are monovalent hydrocarbon radicals, wherein the R' groups are divalent hydrocarbon radicals containing four to five chain carbon atoms and $n$ is an integer of at least one.

2. A difluorophosphorane of the formula $$R_1R_2PF_2(CH_2)_nPF_2R_1R_2$$

wherein the R groups are monovalent hydrocarbon radicals and $n$ is an integer of at least one.

3. A difluorophosphorane of the formula

wherein the R' groups are divalent hydrocarbon radicals containing four-to-five chain carbon atoms and $n$ is an integer of at least one.

4. A trifluorophosphorane of the formula

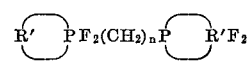

wherein R' is a divalent hydrocarbon radical containing four-to-five chain carbon atoms.

5. A difluorophosphorane of the formula

wherein R is a monovalent hydrocarbon radical and R' is a divalent hydrocarbon radical containing four-to-five chain carbon atoms.

6. A diphosphine disulfide of the formula

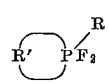

wherein R' is a divalent hydrocarbon radical having four-to-five chain carbon atoms.

7. A method for preparing a fluorophosphorane which comprises contacting a hydrocarbon phosphine sulfide with at least a stoichiometric amount of a fluorinating agent selected from the group consisting of arsenic trifluoride and antimony trifluoride at a temperature between about 60 and 120° C.

8. The process of claim 7 wherein said fluorinating agent is antimony trifluoride.

9. The process of claim 7 wherein the temperature is 80–110° C.

10. The process of claim 7 wherein the phosphine sulfide is of the formula R$_1$R$_2$R$_3$PS, wherein each of the R groups is a hydrocarbon radical.

11. The process of claim 7 wherein the phosphine sulfide is of the formula

wherein R is a monovalent hydrocarbon radical and R' is a divalent hydrocarbon radical.

12. The process of claim 7 wherein the phosphine sulfide is of the formula

wherein $R_1$ and $R_2$ are hydrocarbon radicals

13. The process of claim 7 wherein the phosphine sulfide is of the formula

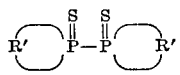

wherein R' is a divalent hydrocarbon radical.

14. The process of claim 7 wherein the phosphine sulfide is of the formula

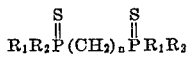

wherein $R_1$ and $R_2$ are hydrocarbon radicals and $n$ is an integer of at least one.

15. The process of claim 7 wherein the phosphine sulfide is of the formula

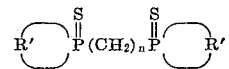

wherein R' is a divalent hydrocarbon radical and $n$ is an integer of at least one.

16. The process of claim 7 wherein the phosphine sulfide is of the formula $RPS_2$, wherein R is a hydrocarbon radical.

References Cited by the Examiner

UNITED STATES PATENTS

| 2,663,738 | 12/1953 | McCormack | 260—606.5 |
| 2,904,588 | 9/1959 | Smith | 260—543 |

OTHER REFERENCES

Muetterties et al., Inorg. Chem., June 1963, pp. 613–618.

LORRAINE A. WEINBERGER, *Primary Examiner.*

LEON ZITVER, *Examiner.*